(12) United States Patent
Liedtke et al.

(10) Patent No.: US 9,927,603 B2
(45) Date of Patent: Mar. 27, 2018

(54) CONFOCAL SCANNING MICROSCOPE, OPERATING METHOD FOR SAME AND METHOD FOR MANIPULATING A SAMPLE

(75) Inventors: Mirko Liedtke, Jena (DE); Eva Simbuerger, Schwielowsee OT Caputh (DE); Daniel Schwedt, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 762 days.

(21) Appl. No.: 14/127,067

(22) PCT Filed: Jun. 15, 2012

(86) PCT No.: PCT/EP2012/061463
§ 371 (c)(1),
(2), (4) Date: Dec. 17, 2013

(87) PCT Pub. No.: WO2012/175424
PCT Pub. Date: Dec. 27, 2012

(65) Prior Publication Data
US 2014/0138517 A1   May 22, 2014

(30) Foreign Application Priority Data
Jun. 18, 2011   (DE) .................. 10 2011 104 379

(51) Int. Cl.
*G02B 21/00* (2006.01)
*H01J 43/30* (2006.01)

(52) U.S. Cl.
CPC ....... *G02B 21/008* (2013.01); *G02B 21/0076* (2013.01); *H01J 43/30* (2013.01)

(58) Field of Classification Search
CPC .. G02B 21/0024; G02B 21/002; G02B 21/00; G02B 21/0032; G02B 21/0048; G02B 21/008; G02B 21/0076; H01J 43/30
(Continued)

(56) References Cited

U.S. PATENT DOCUMENTS 3,821,546 A    6/1974  McClenahan
4,367,404 A *  1/1983  Kaye ............. H01J 43/30
                                         250/207
(Continued)

FOREIGN PATENT DOCUMENTS

DE       41 05 376      9/1991
DE    10 2004 034997    2/2006
(Continued)

OTHER PUBLICATIONS

Notification of Transmittal of the Translation of International Preliminary Report on Patentability dated Jan. 9, 2014.
(Continued)

*Primary Examiner* — Georgia Y Epps
*Assistant Examiner* — Don Williams
(74) *Attorney, Agent, or Firm* — Haug Partners LLP (57) ABSTRACT

A switch which reduces the voltage between the photocathode and the first dynode in the activated switching state compared to the deactivated switching state and a control unit which is adapted to move a target spot, which can be illuminated by means of the light source, over a scanning field by means of a deflecting unit. The control unit activates the switch when the target spot enters a given region of the scanning field and deactivates the switch when the target spot exits the region.

24 Claims, 7 Drawing Sheets

(58) Field of Classification Search
USPC ............... 250/201.1, 201.3, 201.5, 202, 205
See application file for complete search history.

(56) References Cited

U.S. PATENT DOCUMENTS

| | | | |
|---|---|---|---|
| 4,437,763 A * | 3/1984 | Kaye | G01N 21/276 250/207 |
| 6,687,000 B1 | 2/2004 | White | |
| 7,009,699 B2 * | 3/2006 | Wolleschensky | G01J 3/2803 250/458.1 |
| 2006/0011857 A1 | 1/2006 | Funk et al. | |
| 2007/0013898 A1 * | 1/2007 | Wolters | G01N 21/9501 356/237.2 |
| 2008/0180868 A1 | 7/2008 | Schneider | |
| 2009/0046360 A1 | 2/2009 | Funk et al. | |
| 2011/0149388 A1 * | 6/2011 | Liedtke | G02B 21/008 359/385 |
| 2011/0182407 A1 | 7/2011 | Morton | |
| 2011/0204243 A1 | 8/2011 | Bendshan et al. | |

FOREIGN PATENT DOCUMENTS

| | | |
|---|---|---|
| DE | 10 2009 060309 | 6/2011 |
| EP | 1 617 253 | 1/2006 |
| JP | 49-12263 | 3/1974 |
| JP | H06-150877 | 5/1994 |
| JP | 2004-069752 | 3/2004 |
| JP | 2004-133156 | 4/2004 |
| JP | 2005-181581 | 7/2005 |
| JP | 2006-017550 | 1/2006 |
| JP | 2006-154376 | 6/2006 |
| JP | 2010-085608 | 4/2010 |
| WO | WO 2009/150416 | 12/2009 |

OTHER PUBLICATIONS

International Search Report for Application No. PCT/EP2012/061463.

* cited by examiner

CONFOCAL SCANNING MICROSCOPE, OPERATING METHOD FOR SAME AND METHOD FOR MANIPULATING A SAMPLE

The present application claims priority from PCT Patent Application No. PCT/EP2012/061463 filed on Jun. 15, 2012, which claims priority from German Patent Application No. DE 10 2011 104 379.2 filed on Jun. 18, 2011, the disclosures of which are incorporated herein by reference in their entirety.

FIELD OF THE INVENTION

The invention is directed to a confocal raster scanning microscope comprising a light source, an adjustable beam deflecting unit and a photomultiplier (photomultiplier tube or PMT) which has a photocathode, a plurality of dynodes and an anode, an electric circuit for applying a respective (internal) voltage to the dynodes with respect to the photocathode, and a control unit for adjusting the deflecting unit, and to a control method for raster scanning microscopes of this type. The first dynode is that located closest to the photocathode. It has the smallest potential difference with respect to the photocathode. Within the meaning of the invention, the voltages between the dynodes and between the first dynode and the photocathode are also referred to as internal voltages, and the operating high voltage of the PMT is also referred to as external voltage.

It is noted that citation or identification of any document in this application is not an admission that such document is available as prior art to the present invention.

In optical raster scanning microscopes of the type mentioned above, a sample is scanned by a light beam, and the target spot of the light beam scans a given scanning field to capture an image pixel by pixel. The light intensity corresponding to the electrical charge accumulated during the pixel dwell time by a PMT through light absorption is associated with each pixel. Because a laser light source is typically used, microscopes of this kind are also referred to as laser scanning microscopes (LSMs).

By applying respective electric voltages to the dynodes of a PMT, light entering the photomultiplier causes an avalanche of secondary electrons which can be measured with high accuracy. Therefore, photomultipliers are sensitive optoelectronic transducers. The dynodes are typically connected to a voltage divider chain by which a high voltage is applied such that the dynodes exhibit a potential cascade. Depending on the expected photon flux, electronic amplification downstream of the photomultiplier can be regulated in order to obtain an optimum signal for evaluation. It is also possible to influence the gain of a PMT by changing the high voltage, but this kind of adjustment is slow.

Strong light incident on the photocathode causes high electron beam densities within the evacuated multiplier tube. This increases the likelihood of impact ionization of residual gas molecules in the vacuum, which can in turn damage the photocathode; this is referred to as ion feedback. Also, the anode can be damaged as a result of high photoelectron current densities.

Very high light intensities occur in confocal microscopes, particularly when implementing methods for measuring dynamic sample processes on molecular planes in which fluorophores are deliberately bleached in one or more targeted regions of the sample. Such methods include, for example, fluorescence recovery after photobleaching (FRAP), fluorescence loss in photobleaching (FLIP) and fluorescence localization after photobleaching (FLAP). Such methods carry a high risk of damage to a confocally detecting PMT. This is also true of methods in which other materials in a sample region are manipulated by high light intensities, for example, the use of high-intensity light to uncage molecules which then release chemical reagents or fluorophores.

For this reason, control circuits for photomultipliers are usually outfitted with safety devices which respond to an excessive current density by cutting off the high voltage. A protective cutoff of this kind can be carried out by means of a comparator depending on the anode signal, for example, according to JP 2004 069752 A2. The response time for the high voltage is in the millisecond range because the high voltage only collapses slowly after the voltage source is switched off and builds up again slowly correspondingly when switched on again. This is very slow compared to a typical pixel dwell time of a few microseconds. Therefore, when scanning a very bright location the switching off of the PMT is retarded so that the risk of damage persists. Finally, as a result of this slowness the PMT is switched on again after an even longer delay so that subsequent sample regions may not be captured at all.

Figure 1A:
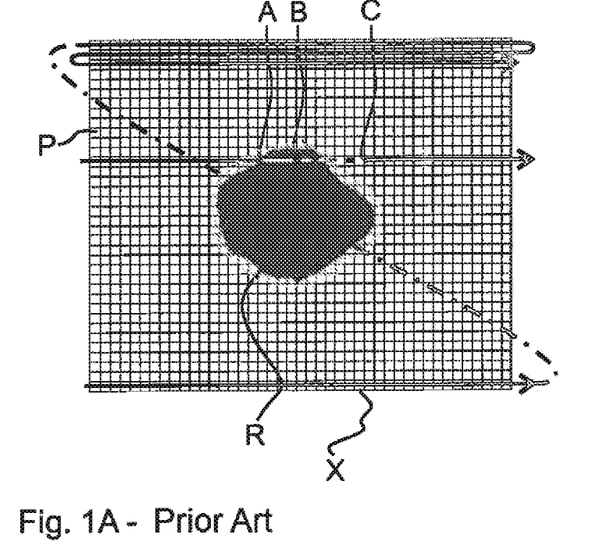
FIG. 1 shows scanning of a sample with bleaching of a sample region according to the prior art, shown schematically.
Figure 1B:
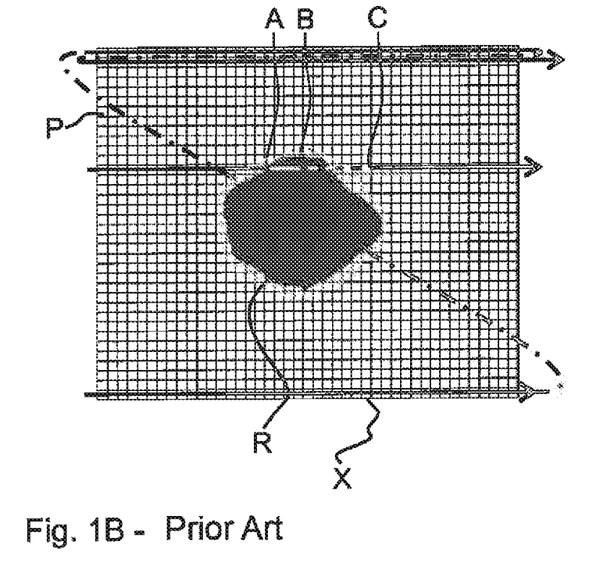

These consequences are illustrated in an example in FIG. 1. To facilitate comprehension, the spatial-temporal conditions are shown in a simplified manner. A light beam scans a sample (movement directions indicated by arrows) along a scanning field X. During this time, the local fluorescence intensities in the instantaneous target spot are captured confocally in pixel P (indicated by a solid black line segment) by a PMT (not shown) with switched-on high voltage. In FIG. 1A, illumination is effected bidirectionally during scanning; the light beam and detection means are switched on over the entire scanning field X. In FIG. 1B, the illumination and detection are carried out unidirectionally during scanning, the light beam is switched on at the start of the line and switched off on flyback; pixels are only captured in every line in one direction.

When the target spot of the light beam enters a region R which is to be bleached (time A), the light output radiated into the sample is greatly increased in both variants in order to deliberately destroy fluorophores present therein. However, the light intensity received by the PMT is so high that the PMT is overloaded (solid white line segment). Because of its strong anode signal, however, the protective cutoff of its high operating voltage persists for some time (only about three pixels P are shown in the simplified diagram) during which the overload persists so that the PMT loses sensitivity and its service life is shortened. The high voltage does not collapse until time B. The scanning process is then continued with switched off high voltage (broken line segment). When the target spot exits the region R to be bleached, the light output is reduced again to the original value. The protection circuit then detects the decreasing light intensity based on the weak anode signal, whereupon the high voltage is switched on again. Owing to the slow switching speed, a certain amount of time elapses (only about five pixels due to the simplified diagram) before the high voltage is built up at time C (solid black line segment) and the PMT again supplies correct data. Accordingly, the pixels located behind region R in the scanning direction up to time C are not imaged correctly.

While it is possible to arrest the protective cutoff of high voltage so that sample regions of this kind with low intensity following high intensity can also be captured, the PMT suffers even more under the high stress. At the end of the scanning field X, the light beam and therefore the resulting target spot are guided back to the start of the scanning field X (dash-dot line). The light beam is switched off during flyback to the start of the scanning field X and the target spot is therefore not illuminated.

As an alternative to cutting off the high voltage, it is known to use a mechanical shutter in front of the PMT. Although the high voltage can still be applied in so doing, mechanical shutters have an even longer switching time than a purely electrical protective cutoff so that there is a higher risk of damaging the PMT.

For observing dynamic processes, the time elapsing between the bleaching process, release or activating process and the image capture is critical to the success of the experiment. Because of the above-described slowness of the protective cutoff, other methods were sought which do without a protective cutoff. For example, it is known to use a second scanning unit for image capture which allows a raster scanning process for exposure and an independent raster scanning process for the image capture. The light-receiving raster scanning process by means of the second scanning unit is carried out only after the leaching/releasing/photoactivating raster scanning process by means of the first scanning unit has concluded. However, the special microscope arrangement required for this is costly. Another procedure consists in carrying out the bleaching during the flyback of the light beam with unidirectional image capture. The disadvantages described above with regard to the life of the detector can also occur in this case when the region to be exposed with greater intensity ends close to the end of the flyback line. Apart from this, the time between exposure and image capture can always be reduced by reducing (cropping) the scanning field to the region R to be observed so that fewer pixels are exposed and captured, and/or by lowering the resolution, particularly in conjunction with a change in magnification (zooming).

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in US. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

It is the object of the invention to improve a raster scanning microscope of the type mentioned above and to provide a corresponding control method which allows improved protection of the PMT against overload.

According to the invention, a confocal raster scanning microscope has a switch which can be switched between an activated switching state and a deactivated switching state, and in the activated switching state it reduces the (internal) voltage between the photocathode and the first dynode compared to the deactivated switching state, and a control unit which is adapted to move (at least) one target spot, which can be irradiated by means of the light source, over a scanning field by means of the deflecting unit, wherein the control unit activates the switch when the target spot enters a given region of the scanning field and deactivates the switch when the target spot exits the region. For example, the activated switching state can correspond to a closed switch position and the deactivated switching state can correspond to an open switch position, or vice versa.

The function of the first acceleration stage of the dynode cascade is critical to the overall gain of a PMT. By reducing the voltage between the first dynode and the photocathode by means of the switch, the first acceleration stage can be attenuated, switched off or have a reversal of polarity for electron deceleration with an extremely short response time of under one microsecond. This makes it possible to influence the secondary electron multiplication and therefore the sensitivity of the PMT in a pixel-accurate manner. If few electrons or no electrons are accelerated in the first acceleration stage, few electrons or no electrons enter the next stages so that the anode signal is substantially weaker than at normal voltage on the first acceleration stage. This protects the PMT against residual gas ionization. Response time based on the evaluation of the anode signal, as known from the prior art, is entirely circumvented by activating the switch in a spatially dependent manner.

The switch for the voltage between the first dynode and the photocathode can also be controlled depending on the anode signal as well as in a spatially dependent manner so that the PMT is also protected from overload outside defined regions and in order to improve recording contrast. This is achieved, for example, by means of comparators which compare the anode signal with at least one threshold value and activate or deactivate the switch depending on the results of the comparison.

In particularly advantageous embodiment forms, the switch is configured in such a way that by switching to the activated switching state it a) electrically short circuits the photocathode with the first dynode or b) reverses the polarity of the voltage between the photocathode and the first dynode, particularly in conjunction with a reduction in the amount of voltage. These switching actions can be achieved without complicated circuits and allow a particularly short switching time. Reversing the polarity of the voltage between the first dynode and the photocathode, for example, from +150 V of the first dynode relative to the photocathode to −150 V acts as an electron brake. Therefore, virtually no electrons reach the anode, and the anode signal disappears. This also effectively switches off the first acceleration stage. Within the meaning of the invention, the amount of voltage between the first dynode and the photocathode need not remain constant when polarity is reversed, but can vary, for example, it can be reduced or increased relative to the acceleration polarity. However, reversal of polarity is more complicated than short circuiting.

The electric circuit is preferably configured to apply an external operating voltage to the photomultiplier independent from the switching state of the switch; in other words, the operating high voltage at the PMT is also maintained when the switch is activated. Accordingly, an anode signal which is proportional to the incident light intensity is also available when the first acceleration stage is reduced, switched off or decelerating. An end of a very bright sample region can be identified in a spatially dependent manner based on this anode signal with a short response time.

Accordingly, the image capture can proceed again with full sensitivity immediately after the end of a very bright sample region.

In an advantageous embodiment form for bleaching, the light source is adjustable with respect to light output (selectively for image capture or bleaching) and the control unit adjusts the light source to a high light output (for bleaching) when the target spot enters the given region and to a lower light output (for image capture) when exiting the region. Thus overload phases can be entirely prevented during bleaching and the accuracy of the overload protection can be significantly improved in this way.

Particularly advantageous embodiment forms comprise a plurality of photomultipliers, each of which has a switch according to the invention which can be switched between an activated switching state and a deactivated switching state, wherein it reduces the (internal) voltage between the photocathode and the first dynode of the respective photomultiplier in the activated switching state, particularly in that it a) electrically short circuits the photocathode with the first dynode or b) reverses the polarity of the voltage between the photocathode and the first dynode, particularly in conjunction with a reduction in the amount of voltage. The life expectancy of the photomultipliers which is improved by means of the invention appreciably reduces maintenance costs for the microscope.

In a first configuration of embodiment forms having a plurality of photomultipliers, the raster scanning microscope preferably comprises optics for simultaneously imaging a plurality of target spots on at least one respective photomultiplier, wherein the control unit activates the switches of these photomultipliers for each target spot independent from the other target spots when entering the given region and deactivates the switches of these photomultipliers for each target spot independent from the other target spots when exiting the given region. This allows a fast scanning of the scanning field and a correspondingly fast bleaching and/or fast image capture. With regard to the illumination, scanning and detection of a plurality of target spots, reference is had to DE 103 44 060 A1, EP 2187252 A1 and U.S. Pat. No. 6,028,306 whose disclosure is incorporated herein as far as possible. An embodiment form of this kind advisably also comprises optics for simultaneous illumination of the plurality of target spots.

In a second configuration of embodiment forms with a plurality of photomultipliers, the raster scanning microscope comprises (at least) one optical element which spatially-spectrally splits the target spot and images it on a plurality of photomultipliers, wherein the control unit activates the switches of all of these photomultipliers when the target spot enters the given region and deactivates the switches of all of these photomultipliers when the target spot exits the given region. The optical element can be, for example, a spectrally selective beamsplitter or an angle dispersive element such as a prism or grating. With regard to spatial-spectral splitting by means of beamsplitters, reference is had to DE 197 02 753 A1 whose disclosure is incorporated herein as far as possible. With regard to spatial-spectral splitting by means of angle dispersive elements, reference is had to DE 100 33 180 A1 whose disclosure is incorporated herein as far as possible. It is also possible to connect a plurality of spectrally splitting elements of the type mentioned above in tandem, particularly with different dispersion directions, for example, in the manner of an echelle spectrometer.

In a third configuration of embodiment forms with a plurality of photomultipliers, the raster scanning microscope comprises optics for imaging different solid angle segments of an input aperture on (at least) one respective photomultiplier, wherein the control unit activates the switches of all of these photomultipliers upon entering the given region and deactivates the switches of all of these photomultipliers upon exiting the given region. Optics of this kind are known, for example, from EP 1664889 A1 whose disclosure is incorporated herein as far as possible. This embodiment form can be combined with an embodiment form in which a plurality of target spots are imaged simultaneously. In this case, a corresponding imaging of solid angle segments of the respective input aperture on respective group of photomultipliers is advisably carried out in every partial beam path.

In embodiment forms with a plurality of photomultipliers, at least one subset of photomultipliers can be integrated in a photomultiplier array. Arrays of this kind are commercially available, in particular from Hamamatsu.

The control method according to the invention comprises the following steps:
  controlling the light source for emitting a first light output,
  applying a first electric voltage between the photocathode and the first dynode for the purpose of accelerating electrons, and
  directing (at least) one light beam of the light source to (at least) one target spot and deflecting the light beam in such a way that the target spot moves over (scans) a scanning field,
wherein the following substeps are carried out during the movement of the target spot:
  determining a position of the target spot,
  ascertaining when a given region of the scanning field to be bleached is reached based on the position of the target spot, and
  when it has been ascertained that the given region has been reached: controlling the light source for emitting a second light output (for example, for bleaching) which is greater than the first light output, and applying a second electric voltage between the photocathode and the first dynode instead of the first voltage, wherein the second voltage is lower than the first voltage, particularly by means of exactly one of the two steps comprising electrically short circuiting the photocathode and first dynode and reversing the polarity of the first voltage, particularly in conjunction with a reduction in the amount of voltage.

The above steps can be carried out, for example, by a respective software module. It is also possible that a software module executes a plurality of steps.

For applying the first voltage, an external operating voltage is preferably applied to the photomultiplier which remains (substantially) applied when the second voltage is applied. A time-consuming cutoff of the operating high voltage can be dispensed with in an advantageous manner.

Embodiment forms in which the following substeps are carried out in addition during the movement of the target spot are particularly advantageous:
  ascertaining when a given region of the scanning field to be bleached has been exited based on the position of the target spot, and then,
  when it has been ascertained that the given region has been exited: controlling the light source for emitting the first light output and applying the first voltage between the photocathode and the first dynode, particularly by means of exactly one of the two steps comprising canceling the short circuiting of photocathode and first dynode and reversal of polarity of the second voltage, particularly in conjunction with an increase in the amount of voltage.

These steps can also be carried out, for example, by a respective software module. It is also possible that a software module executes a plurality of steps.

Generally speaking, the invention comprises a method for the manipulation of a sample by irradiating different places on the sample by a light beam with spatially dependent light output by means of a confocal raster scanning microscope comprising a photomultiplier which has a photocathode, a plurality of dynodes and an anode, wherein an electric voltage is applied in a spatially dependent manner between the photocathode and the first dynode, particularly with (substantially) constant external operating voltage of the photomultiplier.

In an advantageous manner, a plurality of regions can be predetermined in the invention and the photocathode and the first dynode can be controlled identically for these regions. Accordingly, simultaneously occurring processes can be observed at different locations on the sample.

The light output of the light source can preferably be adjustable electro-optically, for example, by means of an electro-optic modulator, or acousto-optically, for example, by means of an acousto-optic modulator.

The invention also comprises a programmable control unit for a confocal raster scanning microscope or computer program for a control unit of this kind adapted to implement a method according to the invention.

In an advantageous manner, the switch has a response time of a maximum of 1 μs. In this way, it is possible in an LSM to deactivate and reactivate the PMT in a pixel-by-pixel manner even with short pixel dwell times. It is particularly advantageous that the normal voltage between photocathode and first dynode can also be restored by means of the switch when exiting a region to be bleached and therefore data can be acquired also with extremely short response times of less than a microsecond. Depending on the type of PMT, only 1/9 to 1/11 of the operating high voltage, i.e., typically less than 150 V, is applied between two dynodes, which can be cut off by means of a switch in an economical manner. The switch is advisably insulated from a high voltage of the photomultiplier.

The confocal raster scanning microscope according to the invention can advantageously be used in FLIP, FLAP, FRAP, photoactivation and/or uncaging.

The invention provides a spatially dependent, fast protective cutoff for PMTs. It makes it possible to improve protection of the PMT, particularly in connection with an irradiation with spatially dependent light output.

BRIEF DESCRIPTION OF THE DRAWINGS

Corresponding parts are designated by the same reference numeral in all of the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows the results of a slow protective cutoff of the operating high voltage of a PMT as a function of the anode signal of the PMT according to the prior art.

Figure 2:
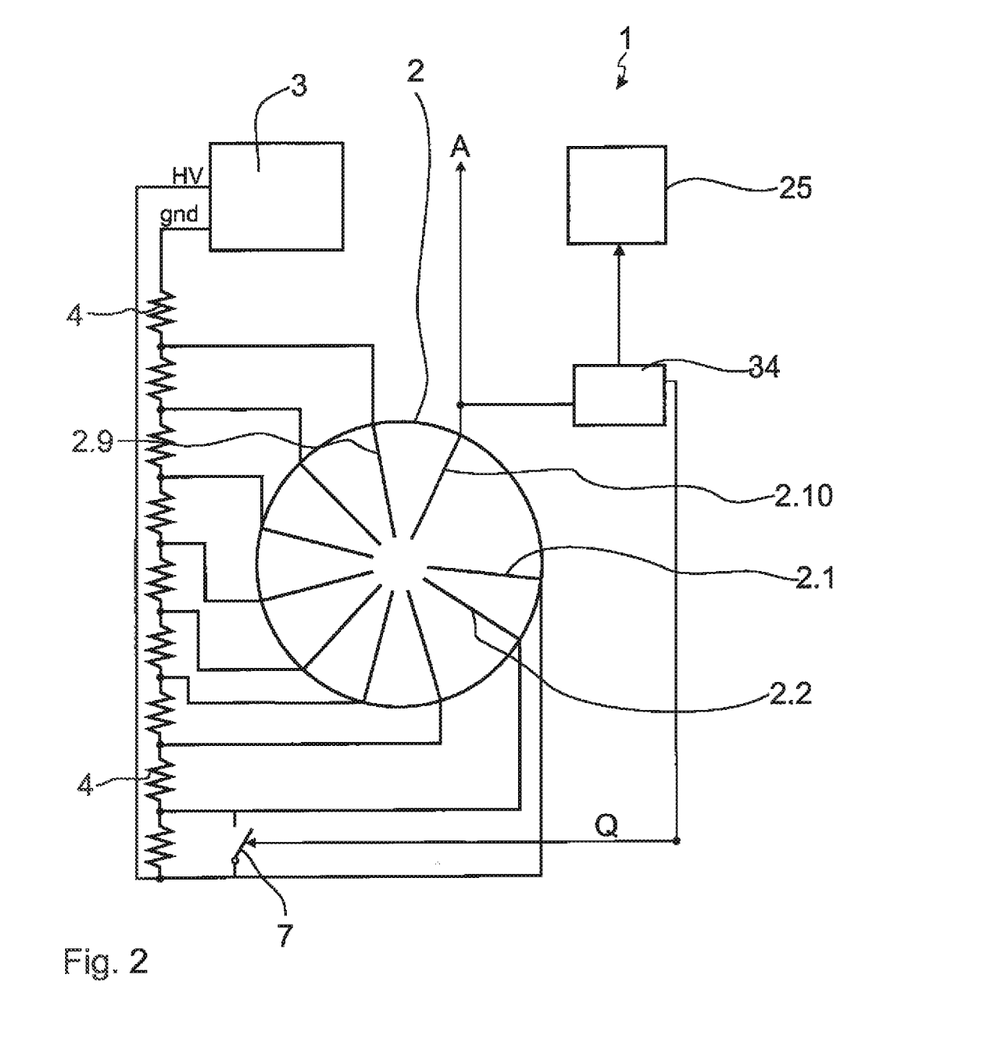
FIG. 2 shows a schematic circuit diagram of a laser scanning microscope.

FIG. 2 shows the circuit diagram of a first exemplary operating circuit 1 for a PMT 2. To facilitate comprehension, only those components which help to explain the invention are shown. The PMT 2 includes a photocathode 2.1, eight dynodes 2.2 . . . 2.9 and an anode 2.10 in addition to an evacuated housing (not shown). The operating circuit 1 comprises a high voltage source 3, the voltage thereof being applied via a series of resistors 4 such that a respective partial voltage drops at each resistor 4 and the adjacent dynodes 2.1 . . . 2.10 therebetween. The resulting potential cascade multiplies the photoelectrons ejected at the cathode 2.1 in a known manner. The current pulse occurring in this way at the anode 2.10 can be converted into an electric voltage as anode signal D, for example, by means of a current-voltage converter unit (not illustrated).

The circuit 1 has a high voltage-insulated switch 7 whose one pole is connected to the photocathode 2.1 and whose other pole is connected to the first dynode 2.2. The switch 7 can be constructed, for example, as an optical coupler, isolation amplifier or relay. It is advisably constructed as a normally open switch and in this embodiment example causes a short circuit between photocathode 2.1 and first dynode 2.2 in the closed (activated) state and accordingly deactivates the first acceleration stage of the PMT 2. The switch 7 doses as long as the switching signal Q emitted by the control unit 34 has, for example, at least a predetermined negative level. When the control unit 34 opens the working contact of the switch 7 again in that it send a more positive signal Q to the latter, for example, the acceleration voltage between cathode 2.1 and first dynode 2.2 builds up again in the shortest possible amount of time. The first acceleration stage is accordingly reactivated. The high voltage HV of the voltage source 3 is maintained during the entire process of deactivation and reactivation of the PMT 2.

In addition to the switch 7, the control unit 34 can also control the light source 25 with respect to the emitted light output. It preferably activates the switch 7 whenever it switches the light source 25 from a lower light output to a higher light output. It preferably deactivates the switch 7 whenever it switches the light source 25 from a higher light output to a lower light output.

Figure 3:
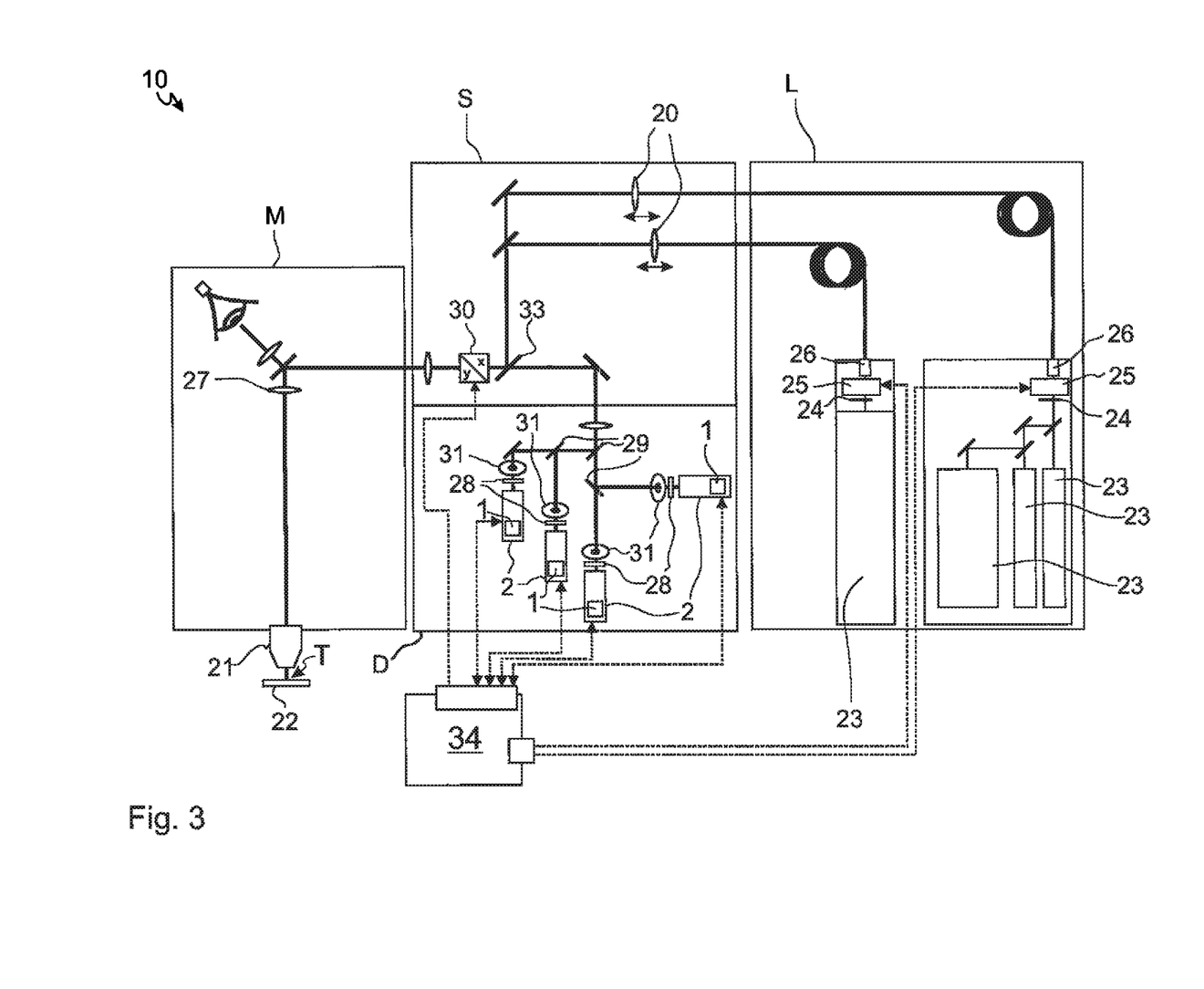
FIG. 3 shows a simplified circuit diagram of a first PMT operating circuit.

A laser scanning microscope 10 with spatially dependent, fast protective cutoff according to FIG. 1 is shown schematically in FIG. 3. The LSM 10 is constructed modularly from an illumination module L with lasers 23, a scanning module S, a detection module D and microscope unit M with microscope objective 31.

Before being fed into the scanning module S via light-guiding fibers and coupling optics 20 and combined, the light of the lasers 23 can be influenced by the control unit 34 by means of light traps 24 and attenuators 25, for example, acousto-optically adjustable filters (acousto-optic tunable filters or AOTF). It passes via the main beamsplitter 33 and X-Y scanner 30, which has two galvanometer mirrors (not shown), through the microscope objective 21 to the sample 22, where it illuminates a target spot T. The attenuators 25 representing the combination of lasers 23, light traps 24 and attenuators 25 will be referred to hereinafter as light source.

Light reflected by the sample or fluorescent light emitted by the sample passes through the microscope objective 21 and then via the scanner 30 through the main beamsplitter 33 into the detection module D. The main beamsplitter 33 may be constructed as a dichroic color splitter, for example. The detection module D has a plurality of detection channels each having a pinhole aperture 31, a filter 28 and a PMT detector 2 which are separated by color splitters 29. Instead of pinhole apertures 31, slit diaphragms (not shown) can also be used, for example, with linear illumination. The confocal pinhole apertures 31 serve to discriminate sample light that does not originate from the focal volume surrounding the target spot T. Therefore, the detectors 2 detect exclusively light from the focal volume. The detectors respectively comprise an operating circuit 1 which provides an operating high voltage and a switch (not shown for the sake of clarity) for influencing the voltage between the photocathode and the first dynode independent from the operating high voltage, and respective evaluation electronics (not shown in more detail here). In other embodiment forms (not shown), the evaluating electronics can be offset from the detectors 2; in particular, they can be arranged outside of the detection module D.

The switch for influencing the voltage between the photocathode and the first dynode is connected to the photocathode and the first dynode in such a way, for example, that it short circuits the photocathode and the first dynode in an activated switching position so that a voltage of 0 V is applied between the first dynode and the photocathode and cancels the short circuit in a deactivated switching position so that the normal voltage, for example, +150 V, is applied between the first dynode and the photocathode.

The confocally illuminated and recorded target spot T in the sample 22 can be moved by the scanner 30 over or through the sample 22 to capture an image pixel by pixel by rotating the galvanometer mirrors of the scanner 30 in a specific manner. Both the movement of the galvanometer mirrors and the switching of the illumination by means of light traps 24 or attenuators 25 are controlled, for example, directly by the control unit 34. Data acquisition by the detectors 2 is likewise carried out by means of the control unit 34 as is the controlling of the switch for influencing the voltage between the photocathode and first dynode. The evaluating unit/control unit 34 may be a commercially available computer, for example.

In an alternative embodiment form (not shown), a plurality of target spots T can be illuminated in the sample 22 simultaneously by optics in the illumination beam path, for example, by means of a lens array. In this case, a plurality of PMTs 2 are advisably arranged in the detection beam path in such a way that they confocally detect precisely one of the target spots T in a respective partial beam path. In addition or alternatively, a spatial spectral splitting can be carried out, for example, by a respective angle dispersive element, in the detection beam path (with a plurality of target spots, for example, in each partial beam path) in front of the detector 2 (with a plurality of target spots, for example, in front of each detector).

In alternative embodiment forms (not illustrated in FIG. 3), in order to influence the voltage between the photocathode and the first dynode the switch can be connected to the photocathode and the first dynode in such a way, for example, that a positive voltage of, e.g., +150 V is applied between the first dynode and the photocathode in an activated switching position and a negative voltage of, e.g., 150 V is applied between the first dynode and the photocathode in a deactivated switching position.

Figure 4A:
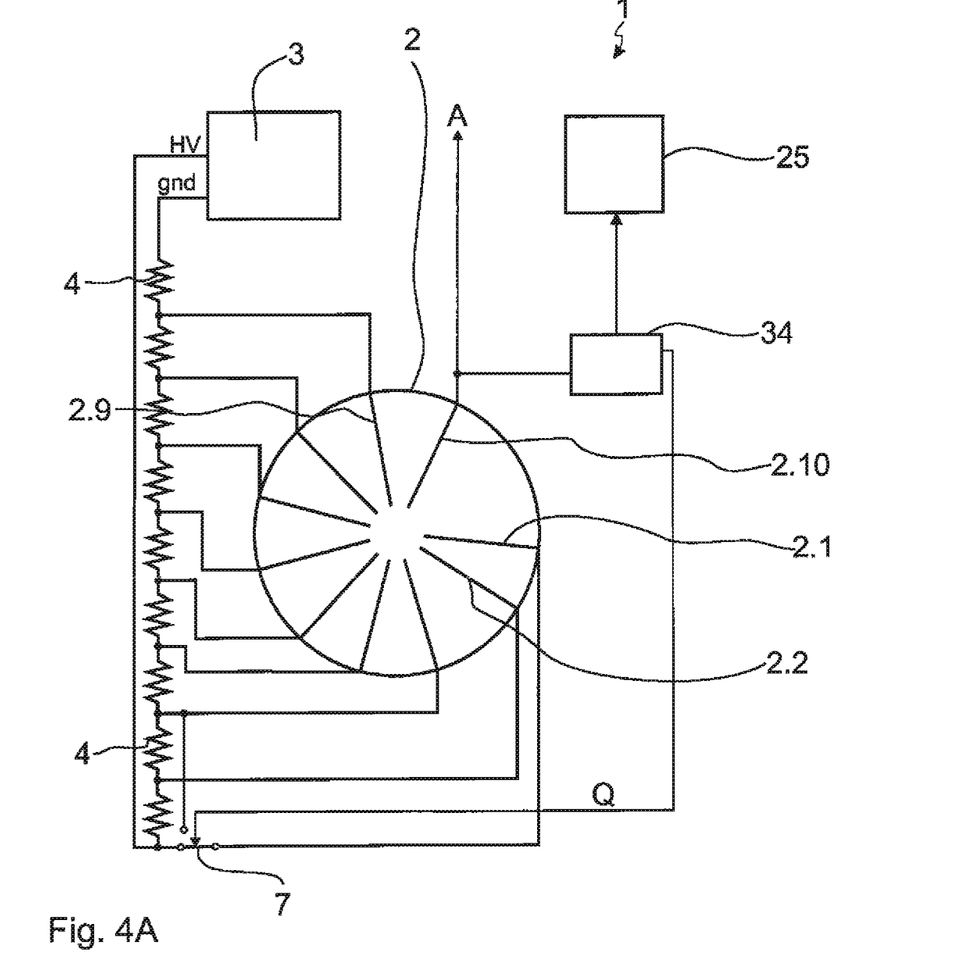
FIG. 4 shows a simplified circuit diagram of a second PMT operating circuit.
Figure 4B:
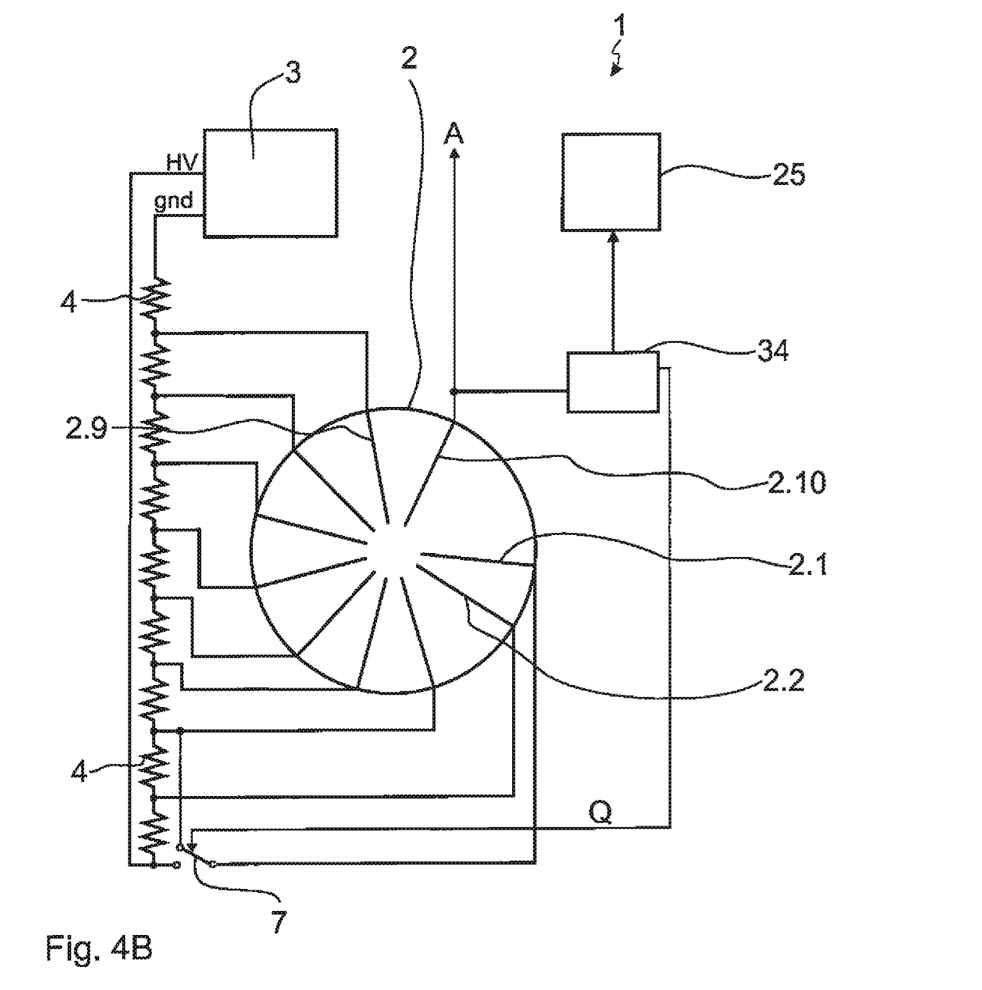

FIG. 4 shows an example of an operating circuit 1 of an alternative embodiment of this kind. It largely corresponds to the circuit 1 shown in FIG. 2, but in this case the switch 7 is configured for reversing the polarity of the voltage between first dynode 2.2 and photocathode 2.1. For this purpose, the switch 7 electrically short circuits the photocathode 2.1 with the second dynode 2.3 in the activated switching state. In the deactivated switching state, dynodes 2.1 . . . 2.10 are associated with the voltage divider cascade in the normal manner. Due to the reversal of polarity, the first acceleration stage acts in the activated switching state of the switch 7 as an electron brake and therefore effectively prevents large photoelectron fluxes.

Figure 5:
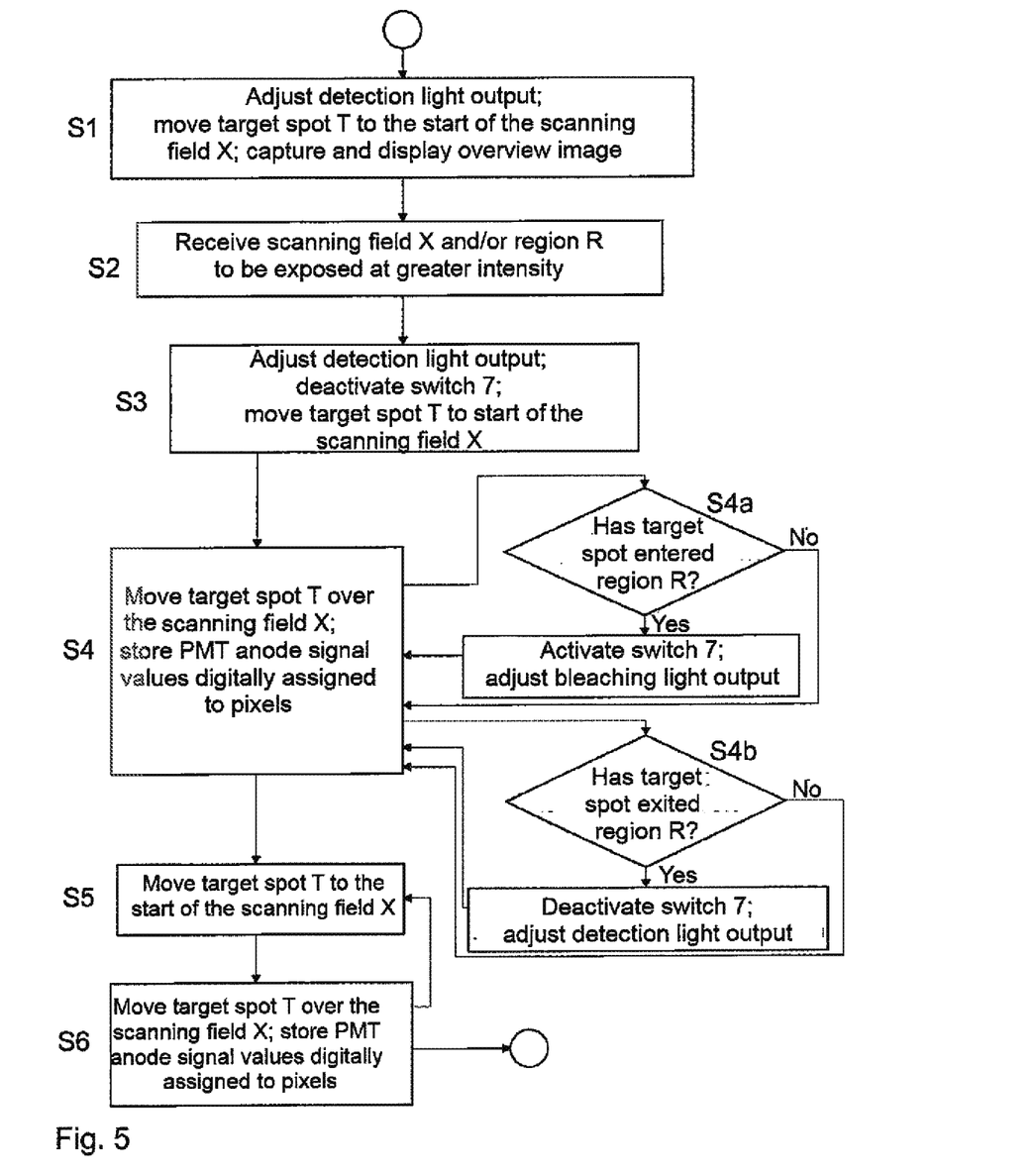
FIG. 5 shows scanning of a sample with bleaching of a sample region according to the invention, shown schematically.

FIG. 5 shows the sequence of an exemplary control method for a LSM 10, for example, according to FIG. 2. In step S1, the control unit 34 first captures an overview image of the sample 22 in a manner known per se with a pure detection light output of the light source 25 and displays it visually to the user. Based on the overview image, the user can define a scanning field X and a region of interest (ROI) therein in which the sample 22 is to be exposed with a higher light output than outside of this region R. Step S1 can be dispensed with if the scanning field X and/or region R are/is already known to the user. In step S2, the sample region R, for example, is displayed to the user by the control unit 34 in a manner known per se. If the control unit 34 already has a data set for scanning field X and/or region R from a different source, the sub step in question can be omitted.

By user command, the control unit 34 switches the light source 25 to detection light output in step S3 and deactivates the switch 7. In step S4, it moves the target spot T over the sample 22 by means of the deflecting unit 30 and in so doing digitally assigns the light intensities accumulated by the detector 2 for each pixel dwell time to corresponding pixels. In the meantime, in step S4a, it continuously compares the instantaneous position of the target spot T to the given region R. When it ascertains that the target spot T has moved beyond an edge of the given region R and has accordingly entered at least partially into the region, it activates the switch 7 and switches the light source 25 to bleaching light output. During step S4, it also constantly compares the instantaneous position of the target spot T to the given region R in step S4b. When it ascertains that the target spot T has moved beyond an edge of the given region R and accordingly has completely exited region R, it deactivates the switch 7 and switches the light source 25 to detection light output. The movement of the target spot T over the sample 22 in step S4 is continued until it has been ascertained that the end of the scanning field X has been reached. The target spot T is then moved to the start of the scanning field X again in step S5 and the sample is scanned again exclusively with detection light output in step S6 and an image is captured.

To observe dynamic processes in the sample 22, steps S5 and S6 are advisably repeated multiple times.

Figure 6:
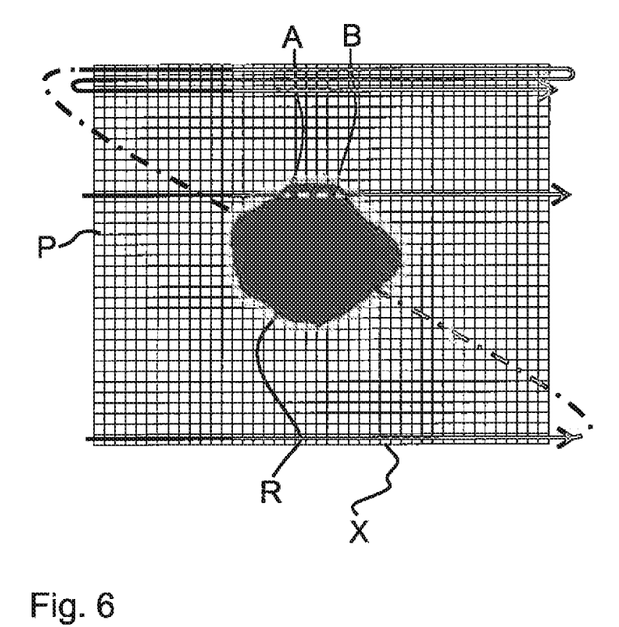
FIG. 6 shows the advantageous results of using one of the operating circuits 1 in a LSM using the example of bleaching a given sample region R.

FIG. 6 shows the advantageous results of using one of the operating circuits 1 described above in a LSM using the example of bleaching a given sample region R. In contrast to the prior art (FIG. 1), the detector is switched off with an error of less than a pixel dwell time by activating switch 7 at time A as the target spot enters the region R to be bleached. Along with the activation of switch 7, the light source 25 is switched to bleaching light output. The reactivation of detection by deactivating switch 7 and switching light source 25 back to normal detection light output takes place at time B as the target spot exits region R. In this way, the subsequent pixels can be detected in a normal manner with an error of at most one pixel.

Since the scanning field X is scanned column by column and line by line and is captured in pixels, the cutoff and reactivation take place in conjunction with the switching of the light output in all of the lines over which region R extends. When there is a plurality of predetermined regions R in the scanning field X, sequences of cutoffs and reactivations can occur repeatedly per line depending on the relative position of the regions R.

Generally, the invention has the advantage that image capture can be switched off in a pixel-accurate manner by activating switch 7 when entering a given region R and switched on again in a pixel-accurate manner by deactivating switch 7 when exiting such that an image of the sample 22, with the exception of region R, can also be captured in a bleaching scan pass. Accordingly, a quantitative evaluation of a sample region which lies outside of region R, for example, when using FLIP, can be carried out with high precision. This is also true when there is a plurality of regions R to be bleached.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 operating circuit
2 PMT
2.1 photocathode
2.2 . . . 2.9 dynode
2.10 anode
3 high voltage source
4 resistor
5 first comparator
6 second comparator
7 switch
10 laser scanning microscope
20 collimating optics
21 microscope objective
22 sample
23 laser
24 light trap
25 attenuator
26 fiber coupler
27 tube lens
28 filter
29 dichroic beamsplitter
30 scanner
31 pinhole diaphragm
32 photomultiplier
33 main beamsplitter
34 control unit
35 dispersive element
A, B, C times
D anode signal
X switching signal
HV/gnd high voltage/ground
P pixel

The invention claimed is:

1. A confocal raster scanning microscope comprising:
a light source;
an adjustable beam deflecting unit;
a photomultiplier comprising:
  a photocathode;
  a plurality of dynodes; and
  an anode;
an electric circuit for applying a respective voltage to the dynodes with respect to the photocathode;
a control unit for adjusting the deflecting unit;
a switch configured to be switched between an activated switching state and a deactivated switching state, wherein, in the activated switching state, the switch reduces the voltage between the photocathode and a first dynode of the plurality of dynodes compared to the deactivated switching state; and
a control unit configured to move one target spot which can be illuminated by means of the light source over a scanning field by means of the deflecting unit;
wherein the control unit is configured to activate the switch when the target spot enters a given region of the scanning field, and to deactivate the switch when the target spot exits the region.

2. The confocal raster scanning microscope according to claim 1;
wherein, by switching to the activated switching state, the switch:
  a) electrically short circuits the photocathode with the first dynode; or
  b) reverses the polarity of the voltage between the photocathode and the first dynode.

3. The confocal raster scanning microscope according to claim 1;
wherein the electric circuit is configured to apply an external operating voltage to the photomultiplier regardless of the switching state of the switch.

4. The confocal raster scanning microscope according to claim 1;
wherein the switch has a maximum switching time of 1 µs.

5. The confocal raster scanning microscope according to claim 1;
wherein an light output of the light source is adjustable, and
wherein the control unit is configured to adjust the light source to a high light output when the target spot enters the given region, and to adjust the light source to a lower light output when the target spot exits the region.

6. The confocal raster scanning microscope according to claim 1, further comprising:
a plurality of photomultipliers, each of which has a switch configured to be switched between an activated switching state and a deactivated switching state;

wherein each switch is configured to reduce the voltage between the photocathode and the first dynode of the respective photomultiplier in the activated switching state.

7. The confocal raster scanning microscope according to claim 6, further comprising:
optics configured to simultaneously image a plurality of target spots on at least one respective photomultiplier;
wherein the control unit is configured to activate the switches of the photomultipliers for each target spot independent from the other target spots when entering the given region, and to deactivate the switches of these photomultipliers for each target spot independent from the other target spots when exiting the given region.

8. The confocal raster scanning microscope according to claim 6, further comprising:
an optical element which spatially-spectrally splits the target spot and images it on a plurality of photomultipliers;
wherein the control unit is configured to activate the switches of all of these photomultipliers upon entry into the given region, and to deactivate the switches of all of these photomultipliers upon exiting the given region.

9. The confocal raster scanning microscope according to claim 6, further comprising:
optics configured to image different solid angle segments of an input aperture on a respective photomultiplier;
wherein the control unit is configured to activate the switches of all of these photomultipliers upon entry into the given region and deactivates the switches of all of these photomultipliers upon exiting.

10. The confocal raster scanning microscope according to claim 6;
wherein at least one subset of photomultipliers is integrated in a photomultiplier array.

11. The confocal raster scanning microscope according to claim 6;
wherein each switch is configured to reduce the voltage between the photocathode and the first dynode of the respective photomultiplier in the activated switching state, in that each switch is configured to:
a) electrically short circuit the photocathode with the first dynode; or
b) reverse the polarity of the voltage between the photocathode and the first dynode.

12. The confocal raster scanning microscope according to claim 11;
wherein each switch is configured to:
a) electrically short circuit the photocathode with the first dynode, in conjunction with reducing the amount of voltage; or
b) reverse the polarity of the voltage between the photocathode and the first dynode, in conjunction with reducing the amount of voltage.

13. A method comprising:
utilizing a confocal raster scanning microscope according to claim 1 in FLIP, FLAP, FRAP, photoactivation, and/or uncaging.

14. A control method for a confocal raster scanning microscope with a light source and a photomultiplier which has a photocathode, a plurality of dynodes, and an anode, the control method comprising the following steps:
controlling the light source for emitting a first light output;
applying a first electric voltage between the photocathode and a first dynode of the plurality of dynodes for the purpose of accelerating electrons; and
directing a light beam of the light source to a target spot and deflecting the light beam in such a way that the target spot moves over a scanning field;
wherein the following substeps are carried out during the movement of the target spot:
determining a position of the target spot;
ascertaining when a given region of the scanning field to be bleached is reached based on the position of the target spot; and
when it has been ascertained that the given region has been reached:
controlling the light source for emitting a second light output for bleaching which is greater than the first light output; and
applying a second electric voltage between the photocathode and the first dynode instead of the first voltage;
wherein the second voltage is lower than the first voltage.

15. The control method according to claim 14;
wherein, for applying the first voltage, an external operating voltage is applied to the photomultiplier, and the external operating voltage remains applied when the second voltage is applied.

16. The control method according to claim 14;
wherein the following substeps are carried out in addition during the movement of the target spot:
ascertaining when a given region of the scanning field to be bleached has been exited based on the position of the target spot; and
then, when it has been ascertained that the given region has been exited:
controlling the light source for emitting the first light output; and
applying the first voltage between the photocathode and the first dynode.

17. The control method according to claim 16;
wherein the first voltage between the photocathode and the first dynode is applied by means of a step selected from the groups consisting of:
canceling a short circuiting of the photocathode and the first dynode; and
reversing the polarity of the second voltage.

18. The control method according to claim 17;
wherein the step, by means of which the first voltage between the photocathode and the first dynode is applied, is performed in conjunction with an increase in the amount of voltage.

19. The control method according to claim 14;
wherein a plurality of regions are predetermined, and
wherein the photocathode and first dynode are controlled identically for the plurality of regions.

20. The control method according to claim 14;
wherein light output of the light source is adjusted electro-optically or acousto-optically.

21. A programmable control unit for a confocal raster scanning microscope with a light source and a photomultiplier which has a photocathode, a plurality of dynodes, and an anode, wherein the control unit is configured to implement the method according to claim 14.

22. A non-transitory computer-readable medium which stores a computer program for controlling a confocal raster scanning microscope with a light source and a photomultiplier which has a photocathode, a plurality of dynodes, and an anode, the computer program performing the method of claim 14.

23. The control method according to claim 14;
wherein the second voltage is lower than the first voltage by means of a step selected from the group consisting of:
    electrically short circuiting the photocathode and the first dynode; and
    reversing the polarity of the first voltage, particularly in conjunction with a reduction in the amount of voltage.
24. The control method according to claim 23;
wherein the step, by means of which the second voltage is lower than the first voltage, is performed in conjunction with reducing the amount of voltage.

* * * * *